US011875294B2

(12) United States Patent
Zhang et al.

(10) Patent No.: US 11,875,294 B2
(45) Date of Patent: Jan. 16, 2024

(54) MULTI-OBJECTIVE RECOMMENDATIONS IN A DATA ANALYTICS SYSTEM

(71) Applicant: Salesforce, Inc., San Francisco, CA (US)

(72) Inventors: Lingtao Zhang, Coquitlam (CA); Chang Lu, Vancouver (CA); Sybil Shim, Vancouver (CA); Amit Kumar, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 263 days.

(21) Appl. No.: 17/030,044

(22) Filed: Sep. 23, 2020

(65) Prior Publication Data
US 2022/0092504 A1 Mar. 24, 2022

(51) Int. Cl.
*G06Q 10/0637* (2023.01)
*G06N 3/126* (2023.01)
*G06N 5/045* (2023.01)

(52) U.S. Cl.
CPC ....... *G06Q 10/06375* (2013.01); *G06N 3/126* (2013.01); *G06N 5/045* (2013.01)

(58) Field of Classification Search
None
See application file for complete search history.

(56) References Cited

U.S. PATENT DOCUMENTS 5,727,161 A * 3/1998 Purcell, Jr. ......... G06Q 10/0637
705/30
7,499,897 B2 3/2009 Pinto et al.
7,730,478 B2 6/2010 Weissman
(Continued)

FOREIGN PATENT DOCUMENTS

JP 6130977 B1 * 5/2017 ............. G06Q 10/04
WO 2020/028382 A1 2/2020

OTHER PUBLICATIONS

Almohri, Haidar, Ratna Babu Chinnam, and Mark Colosimo. "Data-Driven Analytics for Benchmarking and Optimizing Retail Store Performance." arXiv preprint arXiv:1806.05563 (Year: 2018).*
(Continued)

*Primary Examiner* — Shelby A Turner
(74) *Attorney, Agent, or Firm* — Nicholson, De Vos, Webster & Elliott, LLP

(57) ABSTRACT

A method to provide multi-objective recommendations. The method includes receiving user input indicating a plurality of objectives, where each of the plurality of objectives indicates a desired goal for a field of interest, receiving user input indicating a plurality of actionable fields, receiving user input indicating selection of one of a plurality of records in a data set, determining, based on applying an evolutionary algorithm, one or more candidate changes to values of the plurality of actionable fields of the selected record, determining, for each of the one or more candidate changes, a multi-objective score for that candidate change, selecting one or more of the one or more candidate changes to recommend to a user based on the multi-objective scores of the one or more candidate changes, and providing, for display to the user, the selected one or more candidate changes as recommended changes.

19 Claims, 12 Drawing Sheets

(56) References Cited

U.S. PATENT DOCUMENTS

| | | | |
|---|---|---|---|
| 8,744,890 B1* | 6/2014 | Bernier | G06Q 10/063116 705/7.17 |
| 9,898,709 B2 | 2/2018 | Anisingaraju et al. | |
| 10,235,403 B2 | 3/2019 | Rossi et al. | |
| 11,113,256 B2 | 9/2021 | Zhang et al. | |
| 11,138,202 B2 | 10/2021 | Lu et al. | |
| 2002/0169658 A1* | 11/2002 | Adler | G06Q 10/06 705/7.29 |
| 2005/0096950 A1* | 5/2005 | Caplan | G06Q 10/06395 705/7.41 |
| 2015/0206055 A1* | 7/2015 | Sengupta | G06N 5/04 706/46 |
| 2018/0131803 A1 | 5/2018 | Ellis et al. | |
| 2018/0165604 A1 | 6/2018 | Minkin et al. | |
| 2018/0212852 A1 | 7/2018 | Kumar et al. | |
| 2019/0043487 A1 | 2/2019 | Rivkin | |
| 2019/0108432 A1 | 4/2019 | Lu et al. | |
| 2019/0108439 A1 | 4/2019 | Lu et al. | |
| 2019/0156947 A1 | 5/2019 | Nakamura et al. | |
| 2019/0236191 A1 | 8/2019 | Zenger et al. | |
| 2019/0297186 A1 | 9/2019 | Karani | |
| 2019/0361971 A1 | 11/2019 | Zenger et al. | |
| 2020/0081445 A1 | 3/2020 | Stetson et al. | |
| 2020/0090058 A1* | 3/2020 | Fujimoto | G06Q 10/04 |
| 2020/0410394 A1 | 12/2020 | Zhang et al. | |
| 2021/0240519 A1 | 8/2021 | Gitelman et al. | |
| 2021/0312297 A1* | 10/2021 | Francon | G06Q 10/0637 |
| 2022/0019936 A1* | 1/2022 | Sarda | G06N 20/00 |

OTHER PUBLICATIONS

P. Ongsulee, V. Chotchaung, E. Bamrungsi and T. Rodcheewit, "Big Data, Predictive Analytics and Machine Learning," 2018 16th International Conference on ICT and Knowledge Engineering (ICT &KE), 2018, pp. 1-6, doi: 10.1109/ICTKE.2018.8612393. (Year: 2018).*

Almohri, Haidar, Ratna Babu Chinnam, and Mark Colosimo. "Data-Driven Analytics for Benchmarking and Optimizing Retail Store Performance." arXiv preprint arXiv:1806.05563 (2018). (Year: 2018).*

"Introduction to Einstein Prediction Builder" YouTube, uploaded by Salesforce Developers, Apr. 17, 2018, https://www.youtube.com/watch?v=mc04IJK0WLw (Year: 2018).*

"Live Demo: Einstein Discovery" YouTube, uploaded by Salesforce.org, Apr. 5, 2018, https://www.youtube.com/watch?v=DgYY_4LPXOQ (Year: 2018).*

Aprilliant, Audhi "The Step-by-Step Manual Calculation of Genetic Algorithm for Optimization", available online https://audhiaprilliant.medium.com/the-step-by-step-manual-calculation-of-genetic-algorithm-for-optimization-477dad521a1b (Year: 2022).*

Anmol Singh "Heuristic algorithms", available online: https://optimization.cbe.cornell.edu/index.php?title=Heuristic_algorithms (2020) (Year: 2020).*

Tony Nugroho, Emily Yueh, Zirui Liu, Yanshu Li, Ahmed Habib "Evolutionary algorithms", available online: https://optimization.cbe.cornell.edu/index.php?title=Evolutionary_algorithms (Year: 2022).*

Canfora, et al., "Defect Prediction as a Multi-Objective Optimization Problem," Software Testing, Verification and Reliability, published online in Wiley InterScience, https://onlinelibrary.wiley.com/doi/abs/10.1002/stvr.1570, Mar. 8, 2015, pp. 1-34.

Deb, K., "Multi-Objective Optimization Using Evolutionary Algorithms: An Introduction," Indian Institute of Technology Kanpur, Dept. of Mechanical Engineering, KanGAL Report No. 2011003, Feb. 10, 2001, downloaded from https://www.egr.msu.edu/~kdeb/papers/k2011003.pdf on Sep. 17, 2020, pp. 1-24.

Kanter, et al., "Deep Feature Synthesis: Towards Automating Data Science Endeavors," 2015 IEEE International Conference on Data Science and Advanced Analytics (DSAA), Oct. 19-21, 2015, downloaded from https://www.jmaxkanter.com/papers/DSAA_DSM_2015.pdf on Jul. 8, 2020, pp. 1-10.

Mannering, P., "Prescriptive Analytics: Unleash the Optimization Tool," Alteryx, Inc., Sep. 12, 2019, downloaded from https://community.alteryx.com/t5/Data-Science/Prescriptive-Analytics-Unleash-the-Optimization-Tool/ba-p/461416 on Jul. 8, 2020, pp. 1-8.

Rudolph, Günter. "Convergence of Evolutionary Algorithms in General Search Spaces.", Available Online at <https://www.researchgate.net/publication/3642792>, In Proceedings of the Third IEEE Conference on Evolutionary Computation, Jun. 1996, 6 pages.

Sudhoff, S., "Lecture 9: Multi-Objective Optimization," Purdue University, School of Electric Computer Engineering, ECE 630, Special Topics: Engineering Analysis and Design Using Genetic Algorithms, Summer 2007, downloaded from https://engineering.purdue.edu/~sudhoff/ee630/Lecture09.pdf on Jul. 8, 2020, pp. 1-50.

* cited by examiner

Combine Multiple Goals

Select Actionable Variables

An actionable variable is one that people can control, such as deciding which marketing campaign to use for a particular customer. Select actionable variables only. Do not select any variables that cannot be controlled, such as customer address information.

| Name | Type |
|---|---|
| Fuel Consumption | Number |
| Reliability | Number |
| Number of Passengers | Number |

Einstein is here to help

Why select actionable variables?

Einstein uses actionable variables to recommend ways in which to improve your outcome. All recommendations are based on the actionable variables you select here.

FIG. 5

Record

Speed: 115 mph

Speed: 4500 lbs

Safety Rating: 5

Fuel Consumption: 22 mpg

Reliability: 8

Number of Passengers: 8

THE ONE OR MORE CANDIDATE CHANGES ARE DETERMINED BASED ON SUBSTITUTING THE VALUES OF THE ONE OR MORE ACTIONABLE FIELDS WITH PREVIOUSLY OBSERVED VALUES OF THE ONE OR MORE ACTIONABLE FIELDS AND PREDICTING WHICH SUBSTITUTIONS YIELD AN IMPROVEMENT TO THE SELECTED RECORD WITH RESPECT TO AT LEAST ONE OF THE PLURALITY OF OBJECTIVES
850A

FOR EACH OBJECTIVE:

FOR EACH ACTIONABLE FIELD:

DETERMINE PREVIOUSLY OBSERVED VALUES OF THAT ACTIONABLE FIELD
910

FOR EACH PREVIOUSLY OBSERVED VALUE:

SUBSTITUTE VALUE OF ACTIONABLE FIELD WITH THE PREVIOUSLY OBSERVED VALUE
920

PREDICT VALUE OF THE FIELD OF INTEREST USING PREDICTIVE MODEL OF THE FIELD OF INTEREST
930

SUBSTITUTION YIELDS IMPROVEMENT TO RECORD WITH RESPECT TO OBJECTIVE?
940

YES → DESIGNATE SUBSTITUTION AS A CANDIDATE CHANGE
950

NO → DO NOT DESIGNATE SUBSTITUTION AS A CANDIDATE CHANGE
960

FIG. 9

THE ONE OR MORE CANDIDATE CHANGES ARE DETERMINED BASED ON APPLYING AN EVOLUTIONARY ALGORITHM TO A POPULATION OF PREVIOUSLY OBSERVED VALUES OF THE PLURALITY OF ACTIONABLE FIELDS TO FIND A NON-DOMINATED SET WITH RESPECT TO THE PLURALITY OF OBJECTIVES
850B

FOR EACH ACTIONABLE FIELD:

DETERMINE PREVIOUSLY OBSERVED VALUES OF THAT ACTIONABLE FIELD
1010

GENERATE AN INITIAL POPULATION USING THE PREVIOUSLY OBSERVED VALUES OF THE PLURALITY OF ACTIONABLE FIELDS
1020

APPLY EVOLUTIONARY ALGORITHM TO INITIAL POPULATION:
1030

FOUND NON-DOMINATED SET?
1040
YES
NO

GENERATE OFFSPRING OF CURRENT POPULATION (E.G., VIA CROSSOVER AND MUTATION)
1050

PREDICT, FOR EACH MEMBER OF THE POPULATION, VALUES OF THE FIELDS OF INTEREST USING PREDICTIVE MODELS OF THE FIELDS OF INTEREST TO PROJECT THE MEMBER INTO N-DIMENSIONAL SPACE (WHERE N IS EQUAL TO THE NUMBER OF OBJECTIVES)
1060

SELECT FITTEST MEMBERS TO GENERATE NEW POPULATION (WHICH MAY INVOLVE DISCARDING MEMBERS USING CROWDING DISTANCE)
1070

DESIGNATE MEMBERS OF NON-DOMINATED SET AS CANDIDATE CHANGES
1080

FIG. 10

MULTI-OBJECTIVE RECOMMENDATIONS IN A DATA ANALYTICS SYSTEM

TECHNICAL FIELD

One or more implementations relate to the field of automated data analytics, and more specifically to generating and providing multi-objective optimization recommendations in a data analytics system.

BACKGROUND

An organization may store various data in a database and make decisions based on that data. For example, a business may store data regarding its customers in a database (e.g., which may be managed by a customer relationship management (CRM) system) and rely on this customer data to make business decisions regarding how to improve business relationships with existing customers, how to market its products/services to gain new customers, and/or how to drive sales growth. However, it may be difficult for an organization to make decisions based on the data due to the sheer volume of raw data that has to be analyzed to gain meaningful insights into that data. Thus, organizations may use automated data analytics tools to gain insights into the data and to help with making decisions based on that data.

Data analytics refers to the analysis of raw data in order to gain insights and make conclusions from the data. Data analytics can reveal trends and metrics that would otherwise be lost in in the mass of information. Data analytics tools may augment business intelligence with statistical modeling and supervised machine learning to automatically identify, surface, and visualize insights into business data. Data analytics tools may use predictive analysis to predict future outcomes and use prescriptive analysis to suggest ways in which predicted outcomes can be improved.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 5 is a diagram illustrating a user interface for allowing a user to specify actionable fields, according to some implementations.

FIG. 9 is a flow diagram of a process for determining candidate changes using a greedy approach, according to some implementations.

FIG. 10 is a flow diagram of a process for determining candidate changes using an evolutionary approach, according to some implementations.

DETAILED DESCRIPTION

Figure 1:
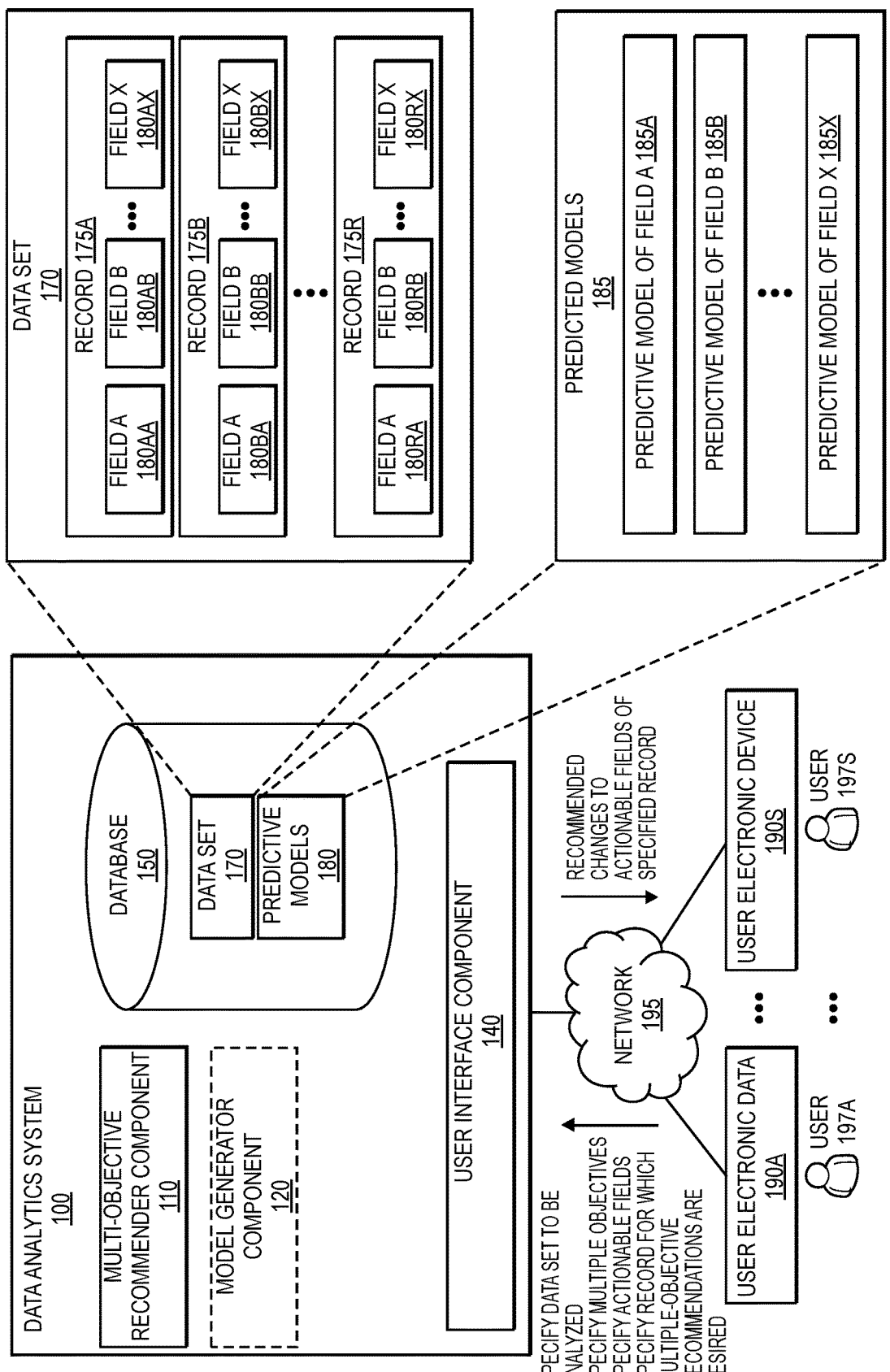
FIG. 1 is a block diagram of an environment in which multi-objective recommendations can be provided, according to some implementations.

The following description describes methods, apparatus, and systems for generating and providing multi-objective recommendations in a data analytics system.

The typical workflow for existing data analytics systems is as follows: 1) the user provides a data set to the data analytics system and specifies a field of the data set that they wish to gain more insight on (the specified field may be referred to as the field of interest); 2) the data analytics system analyzes the data set with respect to the field of interest and generates a report indicating a result of the analysis (e.g., indicating correlations between the field of interest and other fields of the data set) and may also build a predictive model that can be used to predict the value of the field of interest (e.g., as a function of the values of one or more other fields); 3) the user reviews the result of the analysis and hopefully gains some insight on the field of interest; and 4) the data analytics tool may use the predictive model to provide predicted values of the field of interest and/or a set of recommendations on how to improve the predicted values (e.g., how to change the values of other fields to improve the predicted values).

A simple example of a data set is a car specification data set. The car specification data set may include multiple records, where each record represents a specific car make/model. Each record may include fields for speed, weight, safety rating, fuel consumption, reliability, and number of passengers. A typical workflow for a data analytics system may ask the user to select a particular field to either maximize or minimize. If, for example, the user selects the speed field for maximization (the "objective" is to maximize the speed field) the data analytics system may analyze the data set to determine the correlations between the speed field and the other fields to generate insights and create a predictive model for the speed field that can be used to predict speed as a function of weight, safety rating, fuel consumption, reliability, and/or number of passengers. The data analytics system may also use the predictive model to provide recommended changes to the user (regarding how to change the values of one or more fields) that the data analytics system predicts will yield an improvement to a particular record with respect to the objective of maximizing the speed field. Thus, the data analytics system may provide recommended changes to a record that are predicted to yield an improvement to the record with respect to a single objective (that is, they are "single-objective" recommendation). However, real-life situations/problems rarely have a single objective but typically have multiple objectives and require balancing tradeoffs between them. In the car specification data set example, a single-objective recommendation that only takes into account the objective of maximizing speed may reduce safety and fuel efficiency for the sake of maximizing speed, which may result in the data analytics system providing impractical, undesirable, and/or unrealistic recommendations. A more practical approach would be to maximize speed while at the same time maximizing safety and fuel efficiency. This is an example of multiple-objective optimization problem.

Implementations may provide an advantage over existing data analytics systems by allowing users to specify multiple objectives and generating recommendations that take the multiple objectives and the tradeoffs between them into consideration. Such recommendations may be referred to herein as "multi-objective" recommendations. An implementation is a method by one or more computing devices in a data analytics system. The method includes storing a data set including a plurality of records, where each of the plurality of records includes a plurality of fields, receiving user input indicating a plurality of objectives, where each of the plurality of objectives indicates a desired goal for a field of interest, receiving user input indicating a plurality of actionable fields, receiving user input indicating selection of one of the plurality of records in the data set, determining one or more candidate changes to values of the plurality of actionable fields of the selected record, determining, for each of the one or more candidate changes, a multi-objective score for that candidate change based on predicted values of the fields of interest indicated by the plurality of objectives if that candidate change is made, selecting one or more of the one or more candidate changes to recommend to a user based on the multi-objective scores of the one or more candidate changes, and providing, for display to the user, the selected one or more candidate changes as recommended changes. In an implementation, the one or more candidate changes are determined based on substituting the values of the one or more actionable fields with previously observed values of the one or more actionable fields and predicting which substitutions yield an improvement to the selected record with respect to at least one of the plurality of objectives. In an implementation, the one or more candidate changes are determined based on applying an evolutionary algorithm to a population of previously observed values of the plurality of actionable fields to find a non-dominated set with respect to the plurality of objectives. Implementations are further described herein with reference to the accompanying diagrams.

FIG. 1 is a block diagram of an environment in which multi-objective recommendations can be provided, according to some implementations. As shown in the diagram, the environment includes user electronic devices 190A-S that are communicatively coupled to a data analytics system 100 over a network 195. A user electronic device 190 may be, for example, a desktop personal computer, a workstation, a laptop, a Personal Digital Assistant (PDA), a smart phone, or similar electronic device that a user can operate to access the data analytics system 100. Users 197A-197S may operate their respective user electronic devices 190 to access services provided by the data analytics system 100 over the network 195. The network 195 may be, for example, any one or any combination of a LAN (local area network), WAN (wide area network), telephone network, wireless network, point-to-point network, star network, token ring network, hub network, or other appropriate configuration. In an implementation, the user electronic devices 190 communicate with the data analytics system 100 over the internet.

As shown in the diagram, the data analytics system 100 includes a multi-objective recommender component 110, a user interface component 140, and a database 150. The various components of the data analytics system 100 may be implemented using one or more computing devices. The user interface component 140 may generate and provide user interfaces for allowing users 197A-S to access data analytics services provided by the data analytics system 100 via their respective electronic devices 190. For example, the user interface component 140 may provide user interfaces for allowing users to upload, import, and/or select data sets to be analyzed by the data analytics system 100, specify multiple objectives for the data analysis, specify actionable fields for the data analysis, browse through records of a data set, and/or view results of the data analysis (e.g., including predictions and/or multi-objective recommendations generated by the data analytics system 100).

The data analytics system 100 may allow a user to upload, import, and/or specify a data set to be analyzed by the data analytics system 100 (e.g., via a user interface provided by the user interface component 140). If the data set that a user wishes to be analyzed by the data analytics system 100 does not already exist in the database 150 then the user may upload the desired data set to the data analytics system 100 or import the desired data set into the data analytics system 100 (e.g., from a remote database that resides externally to the data analytics system 100 or from a remotely stored file (e.g., a comma value separated (CSV) file)). The data analytics system 100 may store the data sets uploaded/imported by users in the database 150. If the data set that a user wishes to be analyzed by the data analytics system 100 already exists in the database 150 (e.g., because the user or other user previously uploaded/imported the data set to the data analytics system 100), then there may be no need for the user to upload/import the data set. In this case, the user may simply specify to the data analytics system 100 which data the user wishes to be analyzed.

The database 150 may store one or more data sets. Each data set may include one or more records, where each record includes multiple fields. In the example shown in the diagram, the database stores data set 170, which includes records 175A-R. Each of the records 175A-R includes a set of fields. For example, as shown in the diagram, record 175A includes fields 180AA-180AX, record 175B includes fields 180BA-180BX, and so, and record 175R includes fields 180RA-180RX. To provide a more concrete example, the data set 170 may be a car specification data set that includes multiple records 175 that each represents a particular car make/model. Each record 175 may include a speed field for indicating the speed of the car, a weight field to indicate the weight of the car, a safety rating field to indicate the safety rating of the car, a fuel consumption field to indicate the fuel consumption of the car (e.g., expressed in miles per gallon), a reliability field to indicate the reliability rating of the car, and a number of passengers field to indicate the maximum number of passengers for the car. The car specification data set example is used throughout this description to help illustrate implementations of the invention. It should be understood, however, that the car specification data set is provided merely an example and that the multi-objective recommendation techniques described herein can be applied to different data sets. In an implementation, the database 150 is a relational database that includes one or more database tables, where each database table is organized in rows and columns, where the rows correspond to records 175 and the columns correspond to fields 180. While the diagram shows the database 150 storing a single data set 170, it should be understood that the database 150 can store more than one data set 170.

Figure 4:
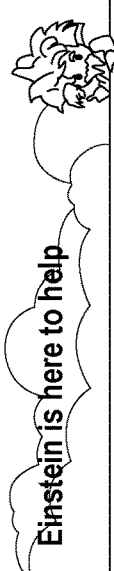
FIG. 4 is a diagram illustrating a user interface for allowing a user to specify multiple objectives, according to some implementations.

The data analytics system 100 may allow users to specify a data set to be analyzed by the data analytics system 100 and to specify multiple objectives for the data analysis (e.g., via a user interface provided by the user interface component 140 such as the interface shown in FIG. 4). As used herein, an objective represents a desired outcome. Each objective may indicate a desired goal for a field of interest. For example, in the car specification data set example, a user may specify the multiple objectives to be: 1) maximize the speed field ("maximize speed" objective); and 2) maximize the weight field ("maximize weight" objective). It should be noted that it is possible for different objectives to conflict with each other. For example, the maximize speed objective and the maximize weight objective may conflict with each other since increasing the weight of a car generally results in decreasing the speed of the car, all other factors being equal.

In an implementation, the data analytics system 100 includes a model generator component 120. The model generator component 120 may generate a predictive model for each of the fields of interest indicated by the multiple objectives. The model generator component 120 may generate predictive models based on applying modeling techniques to the data set 170 or a similar data set. The modeling techniques may include GLM (generalized linear model), GBM (gradient boosting machine), XGBoost, distributed random forest, and/or other suitable techniques for generating predictive models. The data analytics system 100 may use the predictive model of a field of interest to predict the value of that field as a function of the values of one or more other fields. For example, in the car specification data set example, if the multiple objectives are to maximize the speed field and to maximize the weight field, then the model generator component 120 may generate a predictive model for the speed field and a predictive model for the weight field. The data analytics system 100 may then use the predictive model of the speed field to predict the values of the speed field as a function of the values of one or more other fields and use the predictive model of the weight field to predict the value of the weight field as a function of the values of one or more other fields. As an example, the predictive models of the speed field and the weight field may be as follows:

> predicted speed=(coefficient of safety rating)$S$+(coefficient of fuel consumption)$F$+(coefficient of reliability)$R$+(coefficient of number of passengers)$P$ > predicted weight=(coefficient of fuel consumption) $F$+(coefficient of reliability)$R$+coefficient of number of passengers)$P$ In this example, the predictive model of the speed field is a linear predictive model which predicts speed as a function of safety rating (S), fuel consumption (F), reliability (R), and number of passengers (P), where each attribute is weighted using a coefficient value (which indicates the amount of influence that the attribute is predicted to have on speed). Also, in the example above, the predictive model of the weight field is a linear predictive model which predicts weight as a function of fuel consumption (F), reliability (R), and number of passengers (P), where each attribute is weighted using a coefficient value (which indicates the amount of influence that the attribute is predicted to have on weight). While the predictive models in the example above are linear predictive models, some implementations may use non-linear models or a combination of linear models and non-linear models. Also, for simplicity and ease of understanding, an example that has two objectives (i.e., maximize the speed field and maximize the weight field) is provided. However, it should be understood that the techniques described herein can extend to use cases where there are more than two objectives.

In an implementation, the data analytics system 100 allows a user to provide his/her own predictive models (instead of relying on the model generator component 120 to generate predictive models) (e.g., via a user interface provided by the user interface component 140). The data analytics system 100 may store predictive models (e.g., predictive models generated by the model generator component 120 and/or predictive models provided by users) in the database 150. For example, as shown in the diagram, the database 150 stores predictive models 185 that include a predictive model for each of fields A-X (predictive models 185A-X). While the diagram shows the database 150 storing a predictive model 185 for each of the fields (fields A-X), in some implementations the database 150 may only store predictive models 185 for a subset of the fields (e.g., only for those fields that are specified by users as being fields of interest). Also, while the diagram shows the predictive models 185 as being stored in the same database 150 as the data set 170, it should be understood that in some implementations the predictive models 185 and the data set 170 can be stored in different databases.

The data analytics system 100 may further allow a user to specify actionable fields for the data analysis (e.g., via a user interface provided by the user interface component 140 such as the user interface shown in FIG. 5). An actionable field is a field for which the user is willing to change the value of in order to improve an outcome. Actionable field may sometimes be referred to as "actionable variables." As will be further described herein, the multi-objective recommender component 110 may recommend changes to the values of one or more actionable fields of a record 175 that are predicted to yield an improvement to the record 175 with respect to multiple objectives overall.

As mentioned above, when there are multiple objectives, a change to a record that yields an improvement with respect to one of the objectives might be in conflict with another objective. For example, in the car specification data set example, recommendations of reducing weight and reducing safety may yield an improvement with respect to the objective of maximizing speed. However, the recommendation of reducing weight is in direct conflict with the objective of maximizing weight. Thus, in an implementation, the data analytics system 100 may only allow a user to specify as actionable fields those fields that are in the cross section of input fields of the predictive models of the fields of interest. For example, if the objectives are to maximize the speed field and to maximize the weight field (and the predictive models of the speed field and the weight field are the examples provided above), then the data analytics system 100 may only allow the user to specify the fuel consumption field, reliability field, and number of passengers field as actionable fields since these fields are inputs to both predictive models (and the data analytics system 100 may not allow the user to specify the weight field and safety field as actionable fields since these fields are not in the cross section of inputs of the predictive models).

Once the user specifies a data set to be analyzed, specifies the multiple objectives for the data analysis, and specifies the actionable fields for the data analysis, the multi-objective recommender component 110 may generate recommended changes to the values of one or more of the actionable fields of a record 175 that are predicted to yield an improvement to the record 175 with respect to the multiple objectives overall. In an implementation, the multi-objective recommender component 110 generates recommended changes to the values of the one or more actionable fields of a record 175 based on: 1) determining candidate changes to the values of the one or more actionable fields of the record; 2) determining a multi-objective score for each of the candidate changes; and 3) selecting one or more of the candidate changes to recommend to the user based on the multi-objective scores. These operations are described in additional detail below.

As mentioned above, the multi-objective recommender component 110 may determine candidate changes to the values of one or more of the actionable fields of a record. In an implementation, the multi-objective recommender component 110 determines the candidate changes based on substituting the values of the one or more of the actionable fields of the record with previously observed values of the one or more actionable fields and predicting which substitutions yield an improvement to the record with respect to at least one of the multiple objectives. For example, the multi-objective recommender component 110 may determine candidate changes by performing the following operations for each of the multiple objectives. For each actionable field, perform the following operations: 1) determine previously observed values of that actionable field (which can be determined based on training values used during training of the predictive model of that actionable field); and 2) for each of the previously observed values, substitute the value of the actionable field of the record with that previously observed value, predict the value of the field of interest (the field indicated by the objective) using the predictive model of the field of interest (e.g., by plugging in values of the record with the substitution applied into the predictive model), determine whether the substitution yields an improvement to the record with respect to the objective (e.g., the predicted value with the substitution made is closer to the desired goal compared to the predicted value without the substitution), and designate the substitution as a candidate change if the substitution yields an improvement (otherwise do not designate the substitution as a candidate change (i.e., discard the substitution)). As a result, the candidate changes will be the changes that yield an improvement to the record with respect to at least one of the multiple objectives. This approach can be seen as searching for single-objective recommendations for each of the objectives and designating those recommendations as candidate changes. These changes are designated as "candidate" changes because while they are predicted to yield an improvement to the record with respect to at least one of the multiple objectives, they have not yet been evaluated with regard to how they would affect the multiple objectives overall. This approach is referred to herein as the "greedy" approach. This approach may be particularly suitable for cases where the predictive models of the fields of interest are linear predictive models.

Using the car specification data set as an example, assume that the objectives are to maximize the speed field and maximize the weight field and that the actionable fields are the fuel consumption field and the number of passengers field. The multi-objective recommender component 110 may then perform the following operations for the maximize speed objective: 1) determine previously observed values of the fuel consumption field; 2) for each of the previously observed values of the fuel consumption field, substitute the value of the fuel consumption field of the record with that previously observed value, predict the value of the speed field using the predictive model of the speed field, determine whether the substitution yields an improvement to the record with respect to the maximize speed objective, and designate the substitution as a candidate change if the substitution yields an improvement with respect to the maximize speed objective; 3) determine previously observed values of the number of passengers field; 4) for each of the previously observed values of the number of passengers field, substitute the value of the number of passengers field of the record with that previously observed value, predict the value of the speed field using the predictive model for the speed field, determine whether the substitution yields an improvement to the record with respect to the maximize speed objective, and designate the substitution as a candidate change if the substitution yields an improvement with respect to the maximize speed objective. The multi-objective recommender component 110 may then perform similar operations as described above for the maximize weight objective to determine further candidate changes. As a result, the candidate changes are those changes that are predicted to yield an improvement with respect to either the maximize speed objective and/or the maximize weight objective.

In an implementation, the multi-objective recommender component 110 determines the candidate changes to the values of one or more of the actionable fields of a record based on applying an evolutionary algorithm to a population of previously observed values of multiple actionable fields to find a non-dominated set with respect to the plurality of objectives. Evolutionary algorithms use mechanisms inspired by biological evolution such as reproduction, mutation, recombination, and/or selection. An example of an evolutionary algorithm is NSGA-II (Non-dominated Sorting Genetic Algorithm II). The multi-objective recommender component 110 may determine the candidate changes by first determining, for each actionable field, previously observed values of that field (which can be determined based on training values used during training of the predictive model of that field). The multi-objective recommender component 110 may then generate an initial population using the previously observed values of the actionable fields (e.g., as various permutations of the values of the actionable fields seen during training of predictive models). The multi-objective recommender component 110 may then apply an evolutionary algorithm to the initial population. Applying the evolutionary algorithm may involve generating offspring of the initial population (e.g., based on crossover and mutation) and then predicting, for each member of the population (the initial population and the offspring population), predicted values of the fields of interest using predictive models (e.g., by plugging in values of the record with the change represented by the population member applied into the respective predictive models) to project that member into N-dimensional space (where N is equal to the number of objectives). The multi-objective recommender component 110 may then select the fittest members (e.g., those members that are non-dominated or less-dominated) to generate a new population. In an implementation, this may involve discarding members using crowding functions to increase diversity. The multi-objective recommender component 110 may then check whether a non-dominated set (e.g., Pareto optimal set) has been found. A non-dominated set is a set of solutions for which improving the solution with respect to any objective results in worsening at least one other objective. If a non-dominated set has not been found, then the multi-objective recommender component 110 may repeat the operations described above (but using the new population instead of the initial population) to generate another new population. The multi-objective recommender component 110 may repeat this process multiple times to refine the population until a non-dominated set (or an approximation thereof) is found. Once a non-dominated set has been found, the multi-objective recommender component 110 may designate the members of the non-dominated set as candidate changes. This approach is referred to herein as the "evolutionary" approach. This approach may be particularly suitable for cases where the predictive models of the fields of interest include non-linear predictive models.

Using the car specification data set as an example, assume again that the objectives are to maximize the speed field and maximize the weight field and that the actionable fields are the fuel consumption field and the number of passengers field. The multi-objective recommender component 110 may determine the candidate changes by determining previously observed values of the fuel consumption field and the number of passengers field, respectively. The multi-objective recommender component 110 may then generate an initial population using the observed values. For example, the initial population may include various permutations of the previously observed values of the fuel consumption field and the number of passengers field (or a subset thereof) (e.g., pairs (F, P), where F is a previously observed value of the fuel consumption field and P is a previously observed value of the number of passengers field). The multi-objective recommender component 110 may then apply an evolutionary algorithm to the initial population by generating offspring of the initial population and predicting, for each member (e.g., members that are part of the initial population and the offspring population), predicted values of the speed field and weight field using the predictive models of the speed field and the weight field, respectively, to project the member into 2-dimensional space (that includes a dimension for speed and a dimension for weight). The multi-objective recommender component 110 may then select the fittest members to generate a new population. The multi-objective recommender component 110 may then check whether a non-dominated set (or an approximation thereof) has been found. If a non-dominated set has not been found, then the multi-objective recommender component 110 may repeat the operations described above (using the new population) until a non-dominated set has been found. Once a non-dominated set has been found, the multi-objective recommender component 110 may designate the members of the non-dominated set as recommended changes. The non-dominated set includes solutions/members/changes for which any further improvement to the record with respect to the maximize speed objective would result in worsening the record with respect to the maximize weight objective or vice versa.

As mentioned above, the multi-objective recommender component 110 may determine a multi-objective score for each of the candidate changes. A multi-objective score for a candidate change is a score/value that indicates how well a record 175 is predicted to achieve the multiple objectives overall if the candidate change were to be made. In an implementation, the multi-objective score is a numeric value (e.g., a value between 1 and 100), where a higher score is considered to be "better" and a lower score is considered to be "worse" with respect to achieving the multiple objectives overall. However, it should be understood that other conventions can be used (e.g., numeric multi-objective scores where a lower score is considered to be "better" or non-numeric multi-objective scores). The multi-objective recommender component 110 may determine multi-objective scores using a scoring function. The scoring function may be a function that determines a multi-objective score as a function of the predicted values of the fields of interest. For example, in the car specification data set example, if the multiple objectives are to maximize the speed field and to maximize the weight field, then the scoring function may be as follows:

Multi-objective score=(coefficient of speed)$S$+(coefficient of weight)$W$

In the example above, the scoring function is a linear function which determines the multi-objective score as a function of predicted speed (S) and predicted weight (W), where each of these attributes is weighted using a coefficient value (which indicates the relative importance of the attribute with respect to the overall objective). While in some implementations each attribute is weighted equally (e.g., the coefficient values for predicted speed and predicted weight are the same), other implementations may weight different attributes differently. In an implementation, the data analytics system 100 allows a user to set the coefficient values for the scoring function. While the scoring function in this example is a linear function, other implementations may use non-linear functions.

The multi-objective recommender component 110 may determine a multi-objective score for a candidate change based on predicting the values of the fields of interest if the candidate change is made and inputting those values into the scoring function. For example, in the car specification data set example, if a candidate change is to change the value of the number of passengers field of a record from 8 to 5 (e.g., going from an 8-passenger minivan to a 5-passenger sedan), then the multi-objective recommender component 110 may use the predictive model of the speed field and the predictive model of the weight field to predict the values of the speed field and weight field, respectively, if the candidate change is made (e.g., by inputting the values of the fields of the record with the candidate change applied into the predictive models of the speed field and the weight field, respectively). The multi-objective recommender component 110 may then input the predicted values of the speed field and the weight field into the scoring function to determine the multi-objective score for the candidate change.

As mentioned above, the multi-objective recommender component 110 may select one or more of the candidate changes to recommend to the user based on the multi-objective scores. In general, the multi-objective recommender component 110 selects the candidate changes having the "best" multi-objective scores (e.g., the highest multi-objective scores if the convention is that higher scores are "better" with respect to achieving the multiple objectives overall) for recommending to the user. In an implementation, the multi-objective recommender component 110 rules out those of the candidate changes that have multi-objective scores that are worse compared to a threshold multi-objective score. In an implementation, the threshold multi-objective score is set to be the multi-objective score for a "no change" case (e.g., this may result in ruling out any candidate changes that are predicted not to yield an improvement to the record with respect to the multiple objectives overall).

Figure 6:
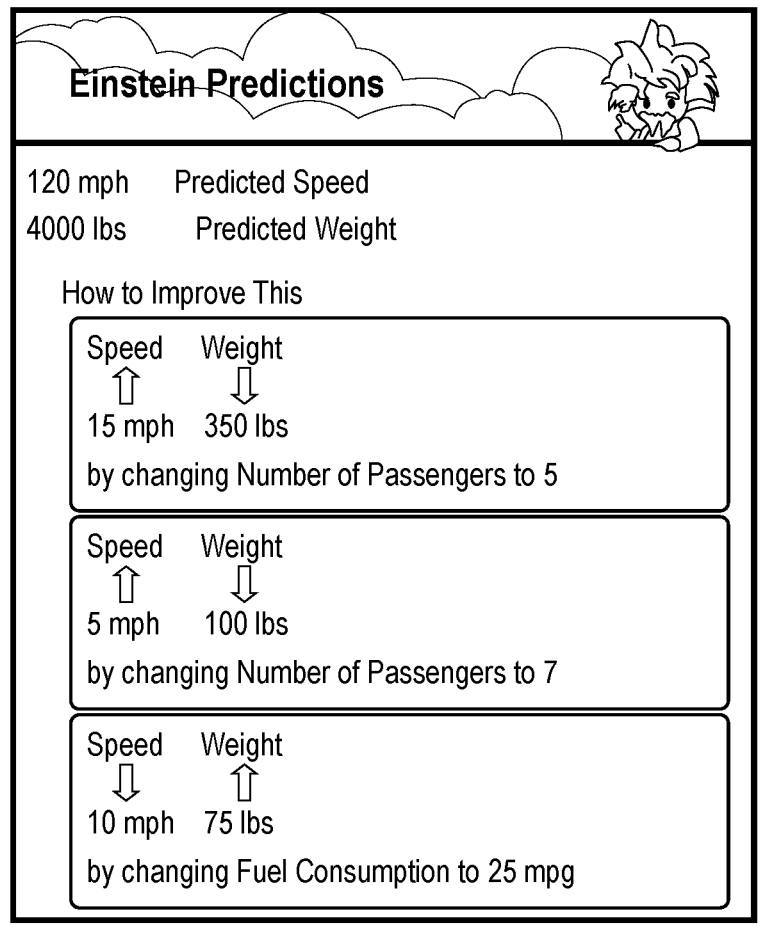
FIG. 6 is a diagram illustrating a user interface for allowing a user to view multi-objective recommendations, according to some implementations.

The data analytics system 100 may provide the candidate changes selected by the multi-objective recommender component 110 to the user as recommended changes (e.g., via a user interface provided by the user interface component 140 such as the user interface shown in FIG. 6). In an implementation, the data analytics system 100 also provides the user with the multi-objective scores of each of the recommended changes and/or other indication of how well the candidate changes are predicted to help with achieving the multiple objectives overall Additionally or alternatively, the data analytics system 100 may provide the user with an indication of how the recommended changes are predicted to affect the different fields of interest. The user may view these recommended changes and decide whether to adopt any of them to better achieve the multiple objectives overall.

The data analytics system 100 may thus allow a user to specify a data set to be analyzed, specify multiple objectives for the data analysis, and specify actionable fields for the data analysis. The data analytics system 100 may then generate recommended changes to the values of one or more actionable fields of a record (e.g., a record specified by the user) that are predicted to yield an improvement to the record with respect to the multiple objectives overall and provide these recommended changes to the user (e.g., over the network 195 to the user's electronic device 190).

A benefit of the multi-objective recommendation techniques described herein is that they allow users to specify multiple (possibly conflicting) objectives and provide recommended changes that take those multiple objectives into considerations and the tradeoffs between them, which better reflects real-life scenarios/problems compared to only taking into account a single objective, as done in conventional data analytics systems.

Figure 7:
FIG. 7 is a diagram illustrating a user interface for allowing a user to specify the values of one or more of the fields and also specify multiple fields as being actionable fields, according to some implementations.

In an implementation, the data analytics system 100 allows the user to specify multiple objectives, specify the values for one or more of the fields, and also specify multiple fields as being actionable fields (e.g., via a user interface provided by the user interface component 140 such as the user interface shown in FIG. 7). The multi-objective recommendation component 110 may then determine recommended values for the multiple actionable fields (that optimize the multiple objectives overall). The recommended values may be determined based on applying an evolutionary algorithm to a population of previously observed values of the multiple actionable fields to find a non-dominated set with respect to the multiple objectives and applying a scoring function to the members in the non-dominated set (in a similar manner as described above). In this way, the data analytics system 100 may allow the user to "explore" or "play around" with different values for the different fields (e.g., instead of having fixed values (e.g., values of a selected record) for the non-actionable fields).

Figure 2:
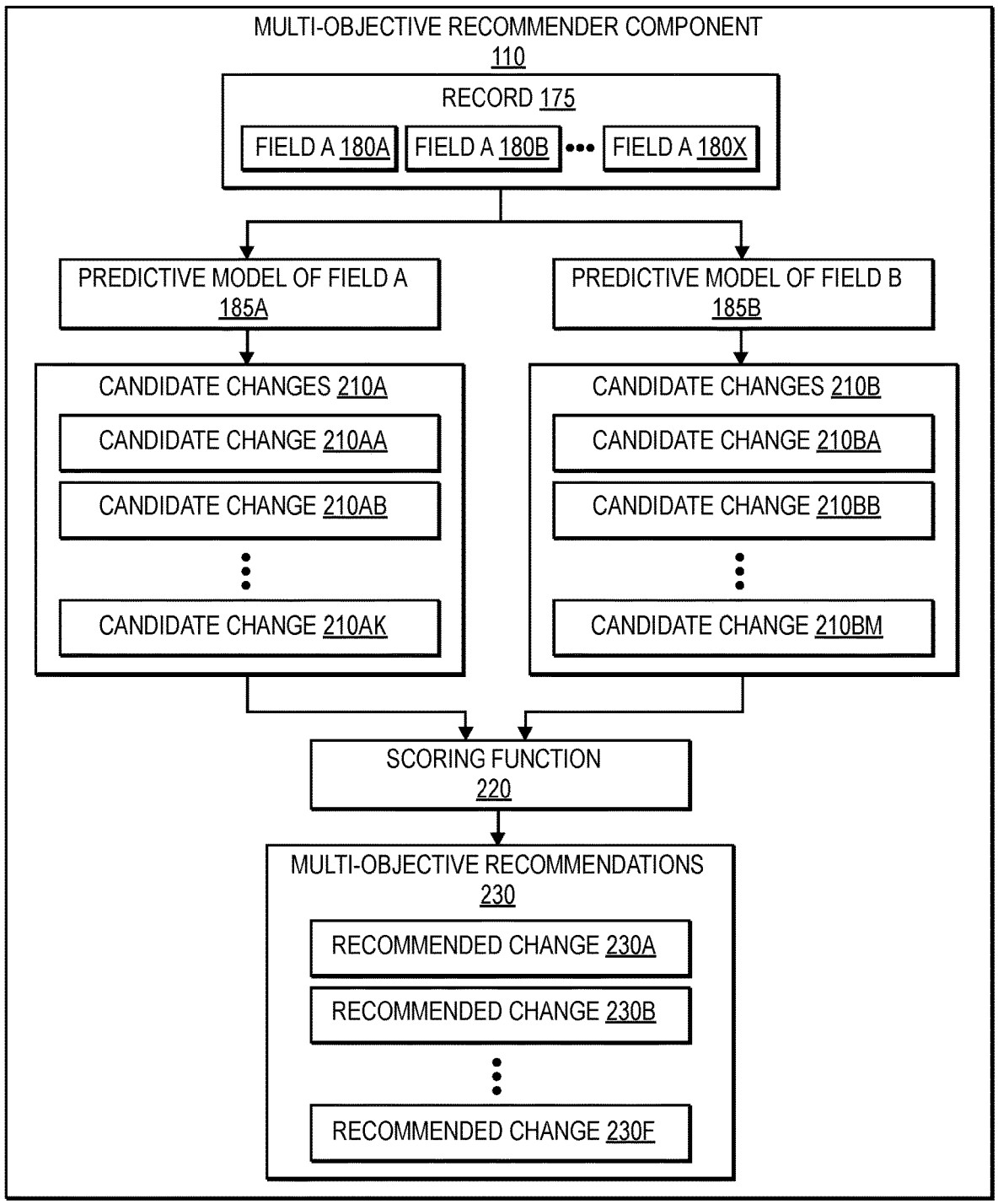
FIG. 2 is a diagram illustrating operations of the multi-objective recommender component for providing multi-objective recommendations using a greedy approach, according to some implementations.

FIG. 2 is a diagram illustrating operations of the multi-objective recommender component for providing multi-objective recommendations using a greedy approach, according to some implementations. The diagram illustrates an example of generating multi-objective recommendations for a given record 175, where the multiple objectives includes an objective involving field A (e.g., maximize field A) and an objective involving field B (e.g., maximize field B). As shown in the diagram, the multi-objective recommender component 110 may use the predictive model of field A 185A to generate candidate changes 210A and use the predictive model of field B 185B to generate candidate changes 210B (e.g., using the techniques described above). Candidate changes 210A are changes to the record 175 that are each predicted to yield an improvement to the record 175 with respect to the objective involving field A while candidate changes 210B are changes to the record 175 that are each predicted to yield an improvement to the record 175 with respect to the objective involving field B. In an implementation, the multi-objective recommender component 110 generates candidate changes 210A by substituting the values of one or more actionable fields of the record 175 with previously observed values of the one or more actionable fields and using the predictive model of field A 185A to determine whether the substitution yields an improvement to the record with respect to the objective involving field A. The multi-objective recommender component 110 may generate candidate changes 210B in a similar manner (but using the predictive model of field B 185B instead of the predictive model of field A 185A). The multi-objective recommender component 110 may then determine a multi-objective score for each of the candidate changes (for each of candidate changes 210AA-210AK and candidate changes 210BA-210BM) using a scoring function 220. For example, the multi-objective recommender component 110 may determine the multi-objective score for a candidate change by predicting the values of the fields of interests if the candidate change is made (e.g., by inputting the values of the record 175 with the candidate change applied to the predictive models 180A and 180B) and inputting the predicted values of the fields of interest into the scoring function 220. The multi-objective recommender component 110 may then select one or more of the candidate changes 210 to recommend to the user as recommended changes 230 based on the multi-objective scores (these recommended changes 230 can be considered as multi-objective recommendations since they take into consideration multiple objectives via the scoring function 220). In this example, the recommended changes 230 include recommended changes 230A-F, which correspond to those of the candidate changes 210 that were selected by the multi-objective recommender component 110 as having the "best" (e.g., highest) multi-objective scores.

Figure 3:
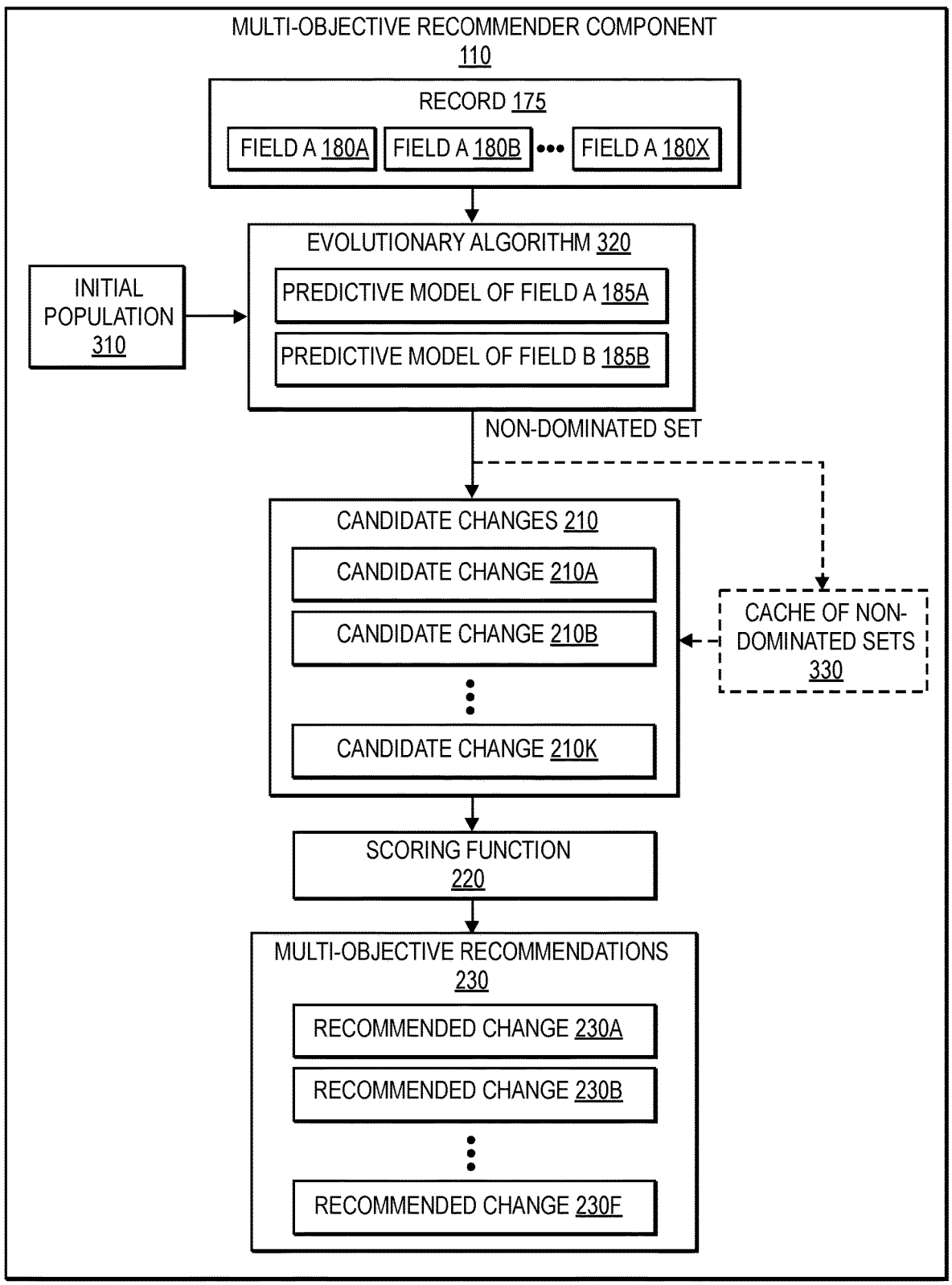
FIG. 3 is a diagram illustrating operations of the multi-objective recommender component for providing multi-objective recommendations using an evolutionary approach, according to some implementations.

FIG. 3 is a diagram illustrating operations of the multi-objective recommender component for providing multi-objective recommendations using an evolutionary approach, according to some implementations. The diagram illustrates an example of generating multi-objective recommendations for a given record 175, where the multiple objectives includes an objective involving field A (e.g., maximize field A) and an objective involving field B (e.g., maximize field B). As shown in the diagram, the multi-objective recommender component 110 may apply an evolutionary algorithm 320 to an initial population 310 to determine a non-dominated set for the record 175. The evolutionary algorithm 320 may make use of the predictive model of field A 185A and the predictive model of field B 185B to project population members into N-dimensional space (where N is equal to the number of objectives), as described above. The members of the non-dominated set are designated as candidate changes 210. In an implementation, since running evolutionary algorithms can be computationally expensive, the multi-objective recommendation component 110 stores the non-dominated set in cache 330 so that it can potentially be re-used later. In an implementation, an entry in the cache 330 is indexed using a hash of the objectives/models, the record, and the actionable variables. If the non-dominated set already exists in the cache, then the multi-objective recommender component 110 may retrieve the non-dominated set from the cache instead of having to re-run the evolutionary algorithm 320. The multi-objective recommender component 110 may then determine a multi-objective score for each of the candidate changes (for each of candidate changes 210A-K) using a scoring function 220. The multi-objective recommender component 110 may determine the multi-objective score for a candidate change by predicting the values of the fields of interests if the candidate change is made (e.g., by inputting the values of the record 175 with the candidate change applied to the predictive models 180A and 180B) and inputting the predicted values of the fields of interest into the scoring function 220. The multi-objective recommender component 110 may then select one or more of the candidate changes to recommend to the user as recommended changes 230 based on the multi-objective scores (these recommended changes 230 can be considered as multi-objective recommendations since they take into consideration multiple objectives via the scoring function 220). In this example, the recommended changes 230 include recommended changes 230A-F, which correspond to those of the candidate changes 210 that were selected by the multi-objective recommender component 110 as having the "best" (e.g., highest) multi-objective scores.

FIG. 4 is a diagram illustrating a user interface for allowing a user to specify multiple objectives, according to some implementations. As shown in the diagram, the user interface includes drop-down menus to allow a user to specify a primary goal (primary objective) and a secondary goal (secondary objective). In this example, the user has set the primary goal to be "maximize speed" and set the secondary goal to be "maximize weight". The user interface also includes an indication of the predictive models that are to be used when generating multi-objective recommendations.

FIG. 5 is a diagram illustrating a user interface for allowing a user to specify actionable fields, according to some implementations. As shown in the diagram, the user interface includes a list of fields that can be selected as actionable variables (i.e., actionable fields). In this example, the list of fields includes the fuel consumption field, the reliability field, and the number of passengers field (e.g., because these fields are in the cross section of input fields of the predictive models of the speed field and the weight field) and the user has selected the fuel consumption field and number of passengers field as actionable variables (by checking the check box next to each of those fields).

FIG. 6 is a diagram illustrating a user interface for allowing a user to view multi-objective recommendations, according to some implementations. As shown in the diagram, the user interface includes a set of recommendations (i.e., recommended changes) for a record in the "How to Improve This" section. In this example, the predicted speed for the record is 120 miles per hour and the predicted weight is 4000 pounds (lbs) (e.g., these values can be determined using predictive models of the speed field and weight field, respectively). The "How to Improve This" section indicates that changing the value of the number of passengers to 5 (from 8) is predicted to yield a 15 mph increase in speed but a 350 pound decrease in weight, changing the value of the number of passengers to 7 (from 8) is predicted to yield a 5 mph increase in speed but a 100 pound decrease in weight, changing the value of the fuel consumption field to 25 miles per gallon (mpg) (from 22 mpg) is predicted to yield a 75 pound increase in weight but a 10 mph decrease in speed. These recommended changes can be determined using the multi-objective recommendation techniques described herein (e.g., using the greedy approach of the evolutionary approach). For sake of simplicity the user interface shows recommendations that involve changing the value of a single actionable field. However, it should be understood that some implementations may generate/provide recommendations that involve changing the values of multiple actionable fields.

FIG. 7 is a diagram illustrating a user interface for allowing a user to specify the values of one or more of the fields and also specify multiple fields as being actionable fields, according to some implementations. As shown in the diagram, the user interface includes drop-down menus to allow a user to specify specific values of different ones of the fields (e.g., fuel consumption field, safety field, reliability field, and number of passengers field). The user interface also includes checkboxes next to each of the fields to allow the user to specify one or more of the fields as actionable fields. This user interface may allow a user to "explore" or "play around" with different values for the different fields.

Figure 8:
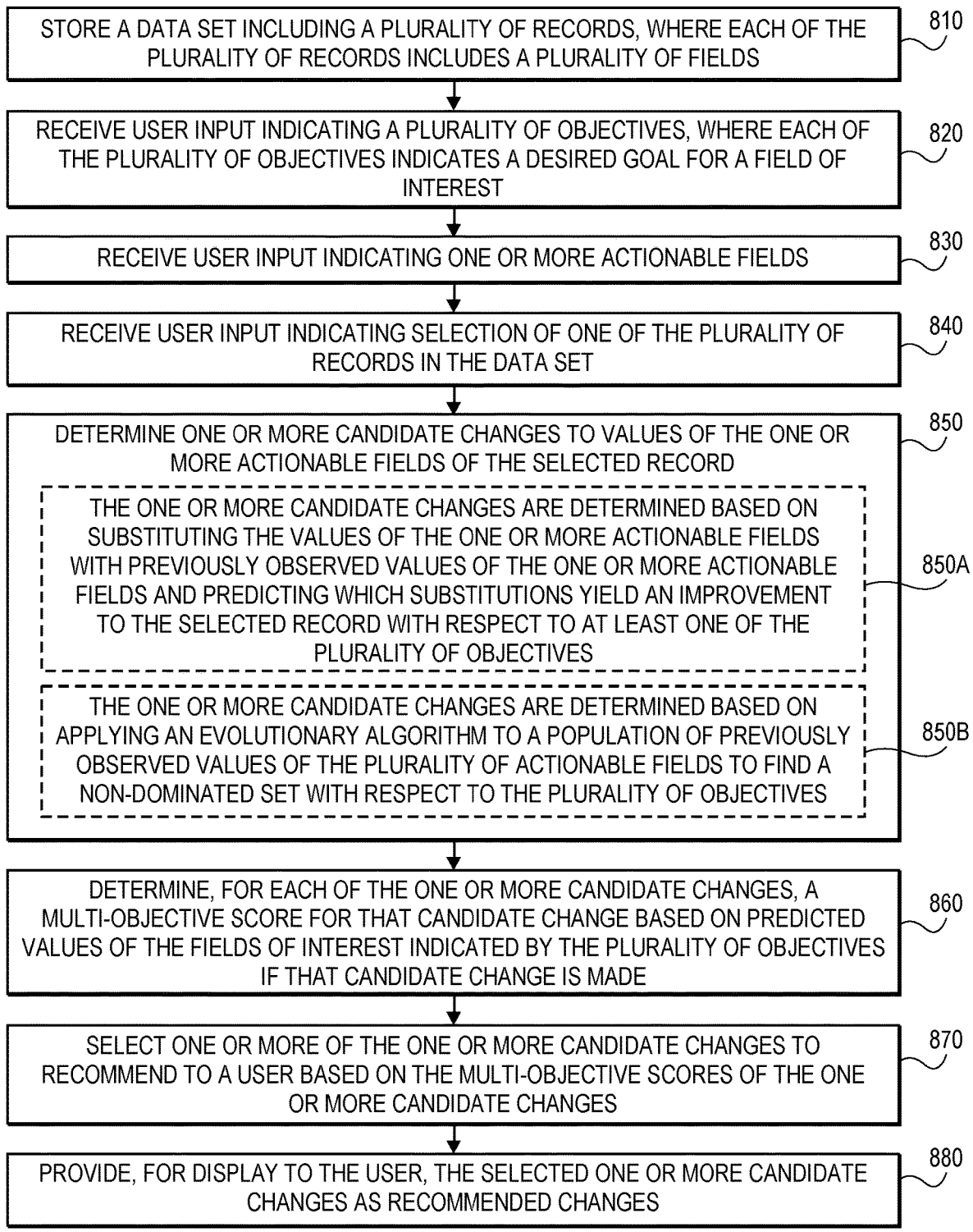
FIG. 8 is a flow diagram of a process for providing multi-objective recommendations, according to some implementations.

FIG. 8 is a flow diagram of a process for providing multi-objective recommendations, according to some implementations. In an implementation, the process is implemented by one or more computing devices in a data analytics system. The process may be implemented using hardware, software, firmware, or any combination thereof. The operations in the flow diagrams are described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams. While the flow diagrams show a particular order of operations performed by certain implementations, it should be understood that such order is exemplary (e.g., alternative implementations may perform the operations in a different order, combine certain operations, overlap certain operations, etc.).

At block 810, the computing device stores a data set including a plurality of records, where each of the plurality of records includes a plurality of fields.

At block 820, the computing device receive user input indicating a plurality of objectives, where each of the plurality of objectives indicates a desired goal for a field of interest. In an implementation, the desired goal for the field of interest indicated by one of the plurality of objectives is to maximize or minimize the field of interest. In an implementation, the computing device generates a user interface that allows the user to specify the plurality of objectives.

At block 830, the computing device receives user input indicating one or more actionable fields. In an implementation, the computing device generates a user interface that allows the user to select actionable fields only from those of the plurality of fields that are in a cross section of input fields of predictive models of the fields of interest.

At block 840, the computing device receives user input indicating selection of one of the plurality of records in the data set.

At block 850, the computing device determines one or more candidate changes to values of the one or more actionable fields of the selected record. In an implementation (e.g., as shown in block 850A), the computing device determines the one or more candidate changes based on substituting the values of the one or more actionable fields with previously observed values of the one or more actionable fields and predicting (e.g., using predictive models of the fields of interest) which substitutions yield an improvement to the selected record with respect to at least one of the plurality of objectives (a greedy approach). In an implementation (as shown in block 850B), the computing device determines the one or more candidate changes based on applying an evolutionary algorithm to a population of previously observed values of the plurality of actionable fields to find a non-dominated set with respect to the plurality of objectives (an evolutionary approach). In an implementation, the evolutionary algorithm uses predictive models of the fields of interest to find the non-dominated set. In an implementation, the predictive models of the fields of interest include at least one non-linear predictive model. In an implementation, the previously observed values are determined based on training values used during training of predictive models of the fields of interest.

At block 860, the computing device determines, for each of the one or more candidate changes, a multi-objective score for that candidate change based on predicted values of the fields of interest indicated by the plurality of objectives if that candidate change is made. In an implementation, the multi-objective scores of the one or more candidate changes are determined using a scoring function, where the scoring function is a non-linear function.

At block 870, the computing device selects one or more of the one or more candidate changes to recommend to a user based on the multi-objective scores of the one or more candidate changes. In an implementation, the selection involves ruling out those of the one or more candidate changes that have multi-objective scores that are worse compared to a threshold multi-objective score.

At block 880, the computing device provides, for display to the user, the selected one or more candidate changes as recommended changes. In an implementation, the computing device generates a user interface that allows the user to view the recommended changes and how the recommended candidate changes are predicted to affect the fields of interest.

In an implementation, the computing device receives user input indicating a second plurality of objectives, where each of the second plurality of objectives indicates a desired goal for a field of interest, receives user input indicating values for one or more of the plurality of fields, receives user input indicating a second plurality of actionable fields, determines recommended values for the second plurality of actionable fields, where the recommended values of the second plurality of actionable fields are determined based on applying the evolutionary algorithm to a population of previously observed values of the second plurality of actionable fields to find a non-dominated set with respect to the second plurality of objectives and determining multi-objective scores for members of the non-dominated set, and provides, for display to the user, the recommended values. In an implementation, the computing device generates a user interface that allows the user to specify the values of the one or more of the plurality of fields and specify the second plurality of actionable fields.

FIG. 9 is a flow diagram of a process for determining candidate changes using a greedy approach, according to some implementations. In an implementation, the process is implemented by one or more computing devices in a data analytics system. The process may be implemented using hardware, software, firmware, or any combination thereof. The process is a possible implementation of the operation shown in block 850A.

The computing device iterates through each of the multiple objectives. For each objective, the computing device iterates through each actionable field. For each actionable field, at block 910, the computing device determines previously observed values of that actionable field. Then, for each of the previously observed values, the computing device at block 920 substitutes the value of actionable field with the previously observed value. At block 930, the computing device predicts the value of the field of interest using predictive model for the field of interest. At decision block 940, the computing device determines whether the substitution yields an improvement with respect to the current objective. If so, at block 950, the computing device designates the substitution as a candidate change. Otherwise, at block 960, the computing device does not designate the substitution as a candidate change.

FIG. 10 is a flow diagram of a process for determining candidate changes using an evolutionary approach, according to some implementations. In an implementation, the process is implemented by one or more computing devices in a data analytics system. The process may be implemented using hardware, software, firmware, or any combination thereof. The process is a possible implementation of the operation shown in block 850B.

The computing device iterates through each actionable field. At block 1010, for each actionable field, the computing device determines previously observed values of that actionable field. At block 1020, the computing device generates an initial population using the previously observed values of the plurality of actionable fields.

At block 1030, the computing device applies an evolutionary algorithm to the initial population. This may involve, at decision block 1040, the computing device checking whether a non-dominated set (or an approximation thereof) has been found. If a non-dominated set is not found, then at block 1050, the computing device generates offspring of the current population (e.g., via crossover and/or mutations). At block 1060, the computing device predicts, for each member of the population (both the current population and the offspring population), values of the fields of interest using predictive models of the fields of interest to project the member into N-dimensional space (where N is equal to the number of objectives). At block 1070, the computing device selects the fittest members to generate a new population (which may involve discarding members using crowding distance—e.g., to increase diversity).

Returning to decision block 1040, if a non-dominated set is found, then at block 1080, the computing device designates members of the non-dominated set as candidate changes.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 11:
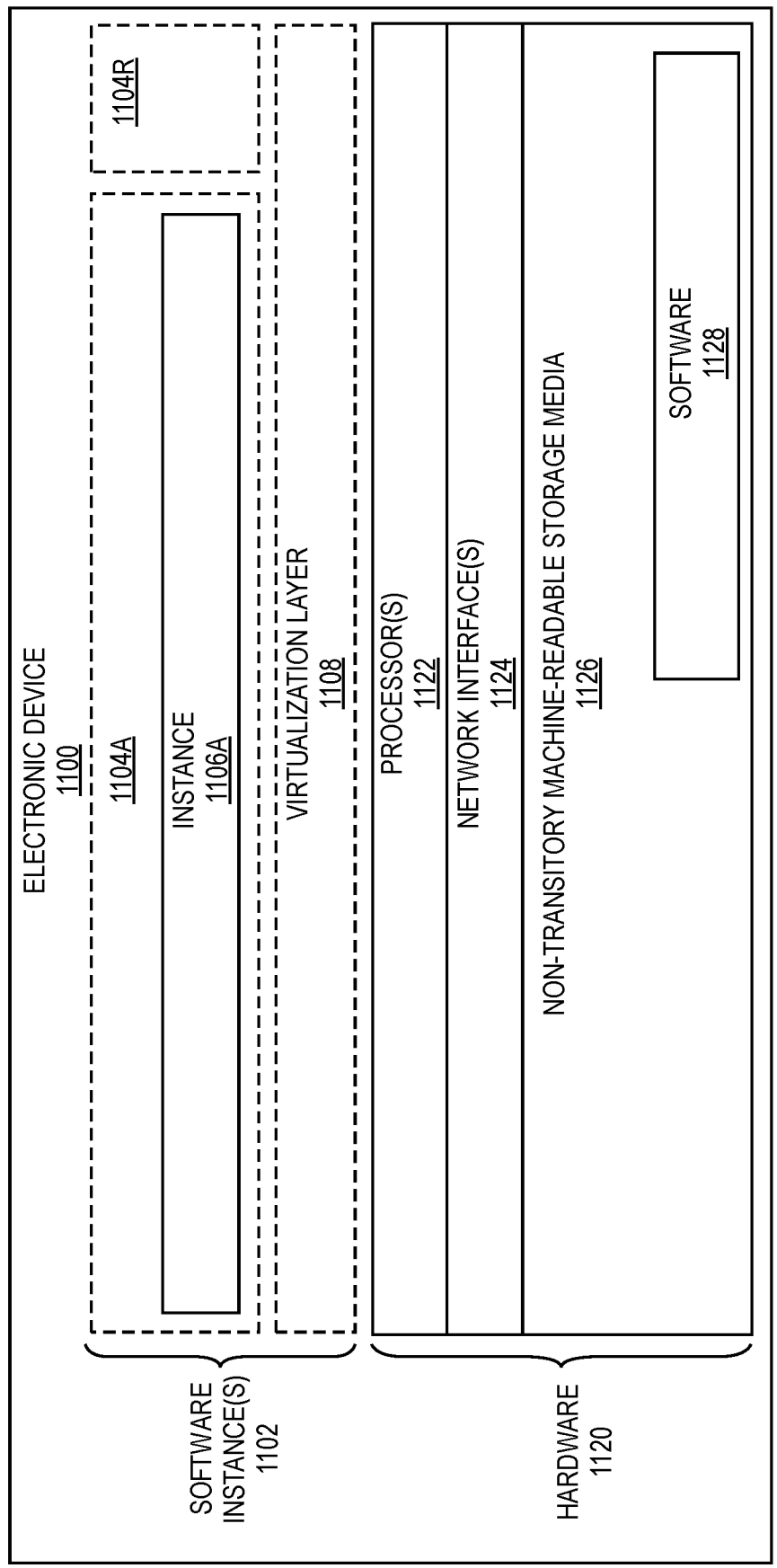
FIG. 11 is a block diagram illustrating an electronic device according to some implementations.

FIG. 11 is a block diagram illustrating an electronic device 1100 according to some implementations. FIG. 11 includes hardware 1120 comprising a set of one or more processor(s) 1122, a set of one or more network interfaces 1124 (wireless and/or wired), and non-transitory machine-readable storage medium/media 1126 having stored therein software 1128 (which includes instructions executable by the set of one or more processor(s) 1122). The previously described data analytics service (which provides multi-objective recommendations) may be implemented in one or more electronic devices 1100. In one implementation: 1) each of the end user electronic devices is implemented as a separate electronic device 1100 (e.g., where the software 1128 represents the software to interface with the data analytics service (e.g., a web browser, a native client, a portal, a command-line interface, and/or an application program interface (API) based upon protocols such as Simple Object Access Protocol (SOAP), Representational State Transfer (REST), etc.)); 2) the data analytics service is implemented in a separate set of one or more of the electronic devices 1100 (e.g., a set of one or more server electronic devices where the software 1128 represents the software to implement the data analytics service); and 3) in operation, the user electronic devices and the electronic devices implementing the data analytics service would be communicatively coupled (e.g., by a network) and would establish between them (or through one or more other layers) connections for submitting user input (e.g., specifying the data set to be analyzed, specify multiple objectives, specify actionable variables, specifying the selected record) to the data analytics service and returning multi-objective recommendations to the user electronic devices. Other configurations of electronic devices may be used in other implementations (e.g., an implementation in which the client used by users to access the data analytics service and the data analytics service itself are implemented on a single electronic device 1100).

In electronic devices that use compute virtualization, the set of one or more processor(s) 1122 typically execute software to instantiate a virtualization layer 1108 and software container(s) 1104A-R (e.g., with operating system-level virtualization, the virtualization layer 1108 represents the kernel of an operating system (or a shim executing on a base operating system) that allows for the creation of multiple software containers 1104A-R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1128 (illustrated as instance 1106A) is executed within the software container 1104A on the virtualization layer 1108. In electronic devices where compute virtualization is not used, the instance 1106A on top of a host operating system is executed on the "bare metal" electronic device 1100. The instantiation of the instance 1106A, as well as the virtualization layer 1108 and software containers 1104A-R if implemented, are collectively referred to as software instance(s) 1102.

Alternative implementations of an electronic device may have numerous variations from that described above. For example, customized hardware and/or accelerators might also be used in an electronic device.

Figure 12:
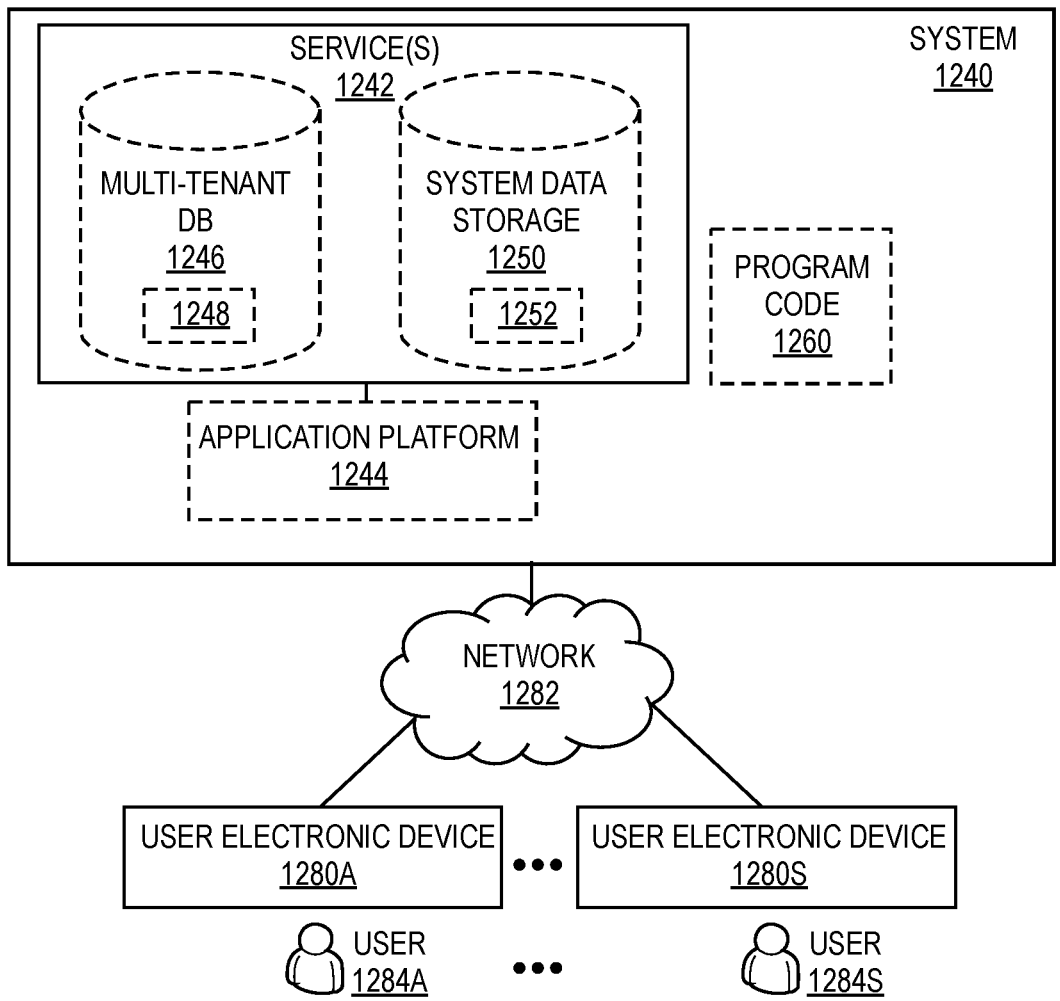
FIG. 12 is a block diagram of an environment in which multi-objective recommendations can be provided, according to some implementations.

FIG. 12 is a block diagram of an environment in which multi-objective recommendations can be provided, according to some implementations. A system 1240 includes hardware (a set of one or more electronic devices) and software to provide service(s) 1242, including the data analytics service. The system 1240 is coupled to user electronic devices 1280A-S over a network 1282. The service(s) 1242 may be on-demand services that are made available to one or more of the users 1284A-S working for one or more other organizations (sometimes referred to as outside users) so that those organizations do not need to necessarily be concerned with building and/or maintaining a system, but instead makes use of the service(s) 1242 when needed (e.g., on the demand of the users 1284A-S). The service(s) 1242 may communication with each other and/or with one or more of the user electronic devices 1280A-S via one or more Application Programming Interface(s) (APIs) (e.g., a Representational State Transfer (REST) API). The user electronic devices 1280A-S are operated by users 1284A-S.

In one implementation, the system 1240 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), a data analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1240 may include an application platform 1244 that enables PAAS for creating, managing, and executing one or more applications developed by the provider of the application platform 1244, users accessing the system 1240 via one or more of user electronic devices 1280A-S, or third-party application developers accessing the system 1240 via one or more of user electronic devices 1280A-S.

In some implementations, one or more of the service(s) 1242 may utilize one or more multi-tenant databases 1246 for tenant data 1248, as well as system data storage 1250 for system data 1252 accessible to system 1240. In certain implementations, the system 1240 includes a set of one or more servers that are running on server electronic devices and that are configured to handle requests for any authorized user associated with any tenant (there is no server affinity for a user and/or tenant to a specific server). The user electronic device 1280A-S communicate with the server(s) of system 1240 to request and update tenant-level data and system-level data hosted by system 1240, and in response the system 1240 (e.g., one or more servers in system 1240) automatically may generate one or more Structured Query Language (SQL) statements (e.g., one or more SQL queries) that are designed to access the desired information from the one or more multi-tenant database 1246 and/or system data storage 1250.

In some implementations, the service(s) 1242 are implemented using virtual applications dynamically created at run time responsive to queries from the user electronic devices 1280A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1260 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1244 includes an application setup mechanism that supports application developers' creation and management of applications, which may be saved as metadata by save routines. Invocations to such applications, including the data analytics service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1282 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1240 and the user electronic devices 1280A-S.

Each user electronic device 1280A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1240. For example, the user interface device can be used to access data and applications hosted by system 1240, and to perform searches on stored data, and otherwise allow a user 1284 to interact with various GUI pages that may be presented to a user 1284. User electronic devices 1280A-S might communicate with system 1240 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1280A-S might include an HTTP client, commonly referred to as a "browser," for sending and receiving HTTP messages to and from server(s) of system 1240, thus allowing users 1284 of the user electronic device 1280A-S to access, process and view information, pages and applications available to it from system 1240 over network 1282.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multitenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

As used herein a "database" is an organized collection of data, generally stored and accessed electronically from a computer system. Databases may be implemented according to a variety of different database models such as relational (such as PostgreSQL, MySQL, and certain Oracle® products), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), where each database object may include a number of records, and each record may include a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. In the case of relational databases, each database typically includes one or more database tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method performed by one or more computing devices of a data analytics system for providing multi-objective recommendations, the method comprising:
    storing a data set including a plurality of records, wherein each of the plurality of records includes a plurality of fields;
    generating a first graphical user interface of the data analytics system that allows a user to specify a plurality of objectives, wherein each of the plurality of objectives indicates a desired goal for a field of interest;
    receiving, via the first graphical user interface, user input indicating the plurality of objectives;
    determining a cross section of input fields of predictive models of the fields of interest indicated by the plurality of objectives;
    generating a second graphical user interface of the data analytics system that allows the user to select a plurality of actionable fields only from those of the plurality of fields that are determined to be in the cross section;
    receiving, via the second graphical user interface, user input indicating selection of the plurality of actionable fields;
    receiving user input indicating selection of one of the plurality of records in the data set;
    determining one or more candidate changes to values of the plurality of actionable fields of the selected record, wherein the one or more candidate changes are determined based on applying an evolutionary algorithm to a population of previously observed values of the plurality of actionable fields to find a non-dominated set with respect to the plurality of objectives;

storing the non-dominated set in a cache, wherein an entry for the non-dominated set in the cache is indexed using a hash that is generated based on the plurality of objectives, the plurality of actionable fields, and the selected record;

determining, for each of the one or more candidate changes, a multi-objective score for that candidate change based on predicted values of the fields of interest indicated by the plurality of objectives if that candidate change is made;

selecting one or more of the one or more candidate changes to recommend to the user based on the multi-objective scores of the one or more candidate changes;

generating a third graphical user interface of the data analytics system that allows the user to view the selected record and the selected one or more candidate changes as recommended changes;

providing, for display to the user, the third graphical user interface;

retrieving the non-dominated set from the cache using the hash as an index; and reusing the non-dominated set when providing a multi-objective recommendation without having to reapply the evolutionary algorithm.

2. The method of claim 1, wherein the desired goal for the field of interest indicated by one of the plurality of objectives is to maximize or minimize the field of interest.

3. The method of claim 1, wherein the evolutionary algorithm uses predictive models of the fields of interest to find the non-dominated set.

4. The method of claim 1, further comprising:
generating a fourth user interface of the data analytics system that allows the user to browse through the plurality of records of the data set and select the selected record.

5. The method of claim 3, wherein the predictive models of the fields of interest include at least one non-linear predictive model.

6. The method of claim 1, wherein the selecting involves ruling out those of the one or more candidate changes that have multi-objective scores that are worse compared to a threshold multi-objective score.

7. The method of claim 1, further comprising:
generating a fourth graphical user interface of the data analytics system that allows the user to upload one or more of the predictive models of the fields of interest.

8. The method of claim 1, wherein the third graphical user interface further allows the user to view how the recommended changes are predicted to affect the fields of interest.

9. The method of claim 1, wherein the multi-objective scores of the one or more candidate changes are determined using a scoring function, wherein the scoring function is a non-linear function.

10. The method of claim 1, wherein the previously observed values of the plurality of actionable fields are determined based on training values used during training of predictive models of the fields of interest.

11. The method of claim 1, further comprising:
receiving user input indicating a second plurality of objectives, wherein each of the second plurality of objectives indicates a desired goal for a field of interest;
receiving user input indicating values for one or more of the plurality of fields;
receiving user input indicating a second plurality of actionable fields;
determining recommended values for the second plurality of actionable fields, wherein the recommended values of the second plurality of actionable fields are determined based on applying the evolutionary algorithm to a population of previously observed values of the second plurality of actionable fields to find a non-dominated set with respect to the second plurality of objectives and determining multi-objective scores for members of the non-dominated set; and
providing, for display to the user, the recommended values.

12. A non-transitory machine-readable storage medium that provides instructions that, if executed by a processor of a computing device of a data analytics system, will cause the computing device to perform operations for providing multi-objective recommendations, the operations comprising:

storing a data set including a plurality of records, wherein each of the plurality of records includes a plurality of fields;

generating a first graphical user interface of the data analytics system that allows a user to specify a plurality of objectives, wherein each of the plurality of objectives indicates a desired goal for a field of interest;

receiving, via the first graphical user interface, user input indicating the plurality of objectives;

determining a cross section of input fields of predictive models of the fields of interest indicated by the plurality of objectives;

generating a second graphical user interface of the data analytics system that allows the user to select a plurality of actionable fields only from those of the plurality of fields that are determined to be in the cross section;

receiving, via the second graphical user interface, user input indicating selection of the plurality of actionable fields;

receiving user input indicating selection of one of the plurality of records in the data set;

determining one or more candidate changes to values of the plurality of actionable fields of the selected record, wherein the one or more candidate changes are determined based on applying an evolutionary algorithm to a population of previously observed values of the plurality of actionable fields to find a non-dominated set with respect to the plurality of objectives;

storing the non-dominated set in a cache, wherein an entry for the non-dominated set in the cache is indexed using a hash that is generated based on the plurality of objectives, the plurality of actionable fields, and the selected record;

determining, for each of the one or more candidate changes, a multi-objective score for that candidate change based on predicted values of the fields of interest indicated by the plurality of objectives if that candidate change is made;

selecting one or more of the one or more candidate changes to recommend to the user based on the multi-objective scores of the one or more candidate changes;

generating a third graphical user interface of the data analytics system that allows the user to view the selected record and the selected one or more candidate changes as recommended changes;

providing, for display to the user, the third graphical user interface;

retrieving the non-dominated set from the cache using the hash as an index; and reusing the non-dominated set when providing a multi-objective recommendation without having to reapply the evolutionary algorithm.

13. The non-transitory machine-readable storage medium of claim 12, wherein the desired goal for the field of interest indicated by one of the plurality of objectives is to maximize or minimize the field of interest.

14. The non-transitory machine-readable storage medium of claim 12, wherein the evolutionary algorithm uses predictive models of the fields of interest to find the non-dominated set.

15. The non-transitory machine-readable storage medium of claim 12, wherein the operations further comprise:
generating a fourth user interface of the data analytics system that allows the user to browse through the plurality of records of the data set and select the selected record.

16. A computing device configured to provide multi-objective recommendations in a data analytics system, the computing device comprising:
one or more processors; and
a non-transitory machine-readable storage medium having instructions stored therein, which when executed by the one or more processors, causes the computing device to:
store a data set including a plurality of records, wherein each of the plurality of records includes a plurality of fields,
generate a first graphical user interface of the data analytics system that allows a user to specify a plurality of objectives, wherein each of the plurality of objectives indicates a desired goal for a field of interest,
receive, via the first graphical user interface, user input indicating the plurality of objectives,
determine a cross section of input fields of predictive models of the fields of interest indicated by the plurality of objectives,
generate a second graphical user interface of the data analytics system that allows the user to select a plurality of actionable fields only from those of the plurality of fields that are determined to be in the cross section,
receive, via the second graphical user interface, user input indicating selection of the plurality of actionable fields,
receive user input indicating selection of one of the plurality of records in the data set,
determine one or more candidate changes to values of the plurality of actionable fields of the selected record, wherein the one or more candidate changes are determined based on applying an evolutionary algorithm to a population of previously observed values of the plurality of actionable fields to find a non-dominated set with respect to the plurality of objectives,
store the non-dominated set in a cache, wherein an entry for the non-dominated set in the cache is indexed using a hash that is generated based on the plurality of objectives, the plurality of actionable fields, and the selected record;
determine, for each of the one or more candidate changes, a multi-objective score for that candidate change based on predicted values of the fields of interest indicated by the plurality of objectives if that candidate change is made,
select one or more of the one or more candidate changes to recommend to the user based on the multi-objective scores of the one or more candidate changes,
generate a third graphical user interface of the data analytics system that allows the user to view the selected record and the selected one or more candidate changes as recommended changes,
provide, for display to the user, the third graphical user interface,
retrieve the non-dominated set from the cache using the hash as an index, and
reuse the non-dominated set when providing a multi-objective recommendation without having to reapply the evolutionary algorithm.

17. The computing device of claim 16, wherein the evolutionary algorithm uses predictive models of the fields of interest to find the non-dominated set.

18. The computing device of claim 17, wherein the predictive models of the fields of interest include at least one non-linear predictive model.

19. The computing device of claim 16, wherein the multi-objective scores of the one or more candidate changes are determined using a scoring function, wherein the scoring function is a non-linear function.

* * * * *